(12) United States Patent
Horie et al.

(10) Patent No.: US 7,639,455 B2
(45) Date of Patent: Dec. 29, 2009

(54) HEAD SUSPENSION AND METHOD OF PROCESSING HEAD SUSPENSION

(75) Inventors: Norio Horie, Yokohama (JP); Tatsuhiko Nishida, Yokohama (JP); Masao Hanya, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 279 days.

(21) Appl. No.: 11/312,824

(22) Filed: Dec. 19, 2005

(65) Prior Publication Data

US 2006/0132979 A1 Jun. 22, 2006

(30) Foreign Application Priority Data

Dec. 17, 2004 (JP) ............... 2004-366335

(51) Int. Cl.
*G11B 21/16* (2006.01)
(52) U.S. Cl. ................................... 360/245.7
(58) Field of Classification Search ............... 360/245.7
See application file for complete search history.

(56) References Cited

U.S. PATENT DOCUMENTS

| | | | |
|---|---|---|---|
| 5,771,136 A | 6/1998 | Girard | |
| 6,172,853 B1 * | 1/2001 | Davis et al. | 360/245.7 |
| 6,373,664 B1 * | 4/2002 | Coon et al. | 360/245.7 |
| 6,388,843 B1 * | 5/2002 | Takagi et al. | 360/245.7 |
| 6,424,498 B1 * | 7/2002 | Patterson et al. | 360/245.7 |
| 6,445,546 B1 * | 9/2002 | Coon | 360/245.7 |
| 6,587,309 B2 * | 7/2003 | Nojima | 360/245.7 |
| 6,995,953 B2 * | 2/2006 | Mahoney et al. | 360/245.7 |
| 2002/0075602 A1 * | 6/2002 | Mangold et al. | 360/245.7 |

* cited by examiner

*Primary Examiner*—Mark Blouin
(74) *Attorney, Agent, or Firm*—Jordan and Hamburg LLP (57) ABSTRACT

A head suspension restricts deformation of a flexure caused by frictional force produced between a hard disk and a slider when the hard disk turns in a reverse direction. The head suspension has a load beam resiliently supported with a base. The base is supported with an arm that is turned around an axis. The load beam applies load onto a head having a slider to write and read data to and from the hard disk. The flexure is attached to the load beam and has a tongue that supports the slider. The flexure is provided with a limiter that limits displacement of the tongue due to frictional force produced between the hard disk and the slider when the hard disk is reversely turned. The limiter is on the base side and faces a free end of the tongue. The limiter is integrally formed from a part of the flexure, to face the free end of the tongue.

8 Claims, 10 Drawing Sheets

HEAD SUSPENSION AND METHOD OF PROCESSING HEAD SUSPENSION

BACKGROUND OF THE INVENTION

1. Field of the Invention

The present invention relates to a head suspension for supporting a slider of a disk drive incorporated in an information processor such as a personal computer, and to a method of processing such a head suspension.

2. Description of Related Art

A hard disk drive (HDD) such as a magnetic disk drive employs hard disks that are rotated at high speed. On each rotating hard disk, a slider attached to a head of a head suspension is slightly floated to write and read data to and from the hard disk through a transducer incorporated in the slider. Namely, the head with the slider is supported with the head suspension so that the slider may be slightly raised from the hard disk.

When stopping the disks, the magnetic disk drive must retract the slider from recording tracks of the hard disk. For this, there are two known methods, i.e., a contact start/stop (CSS) method and a load/unload (LUL) method.

Figure 11A:
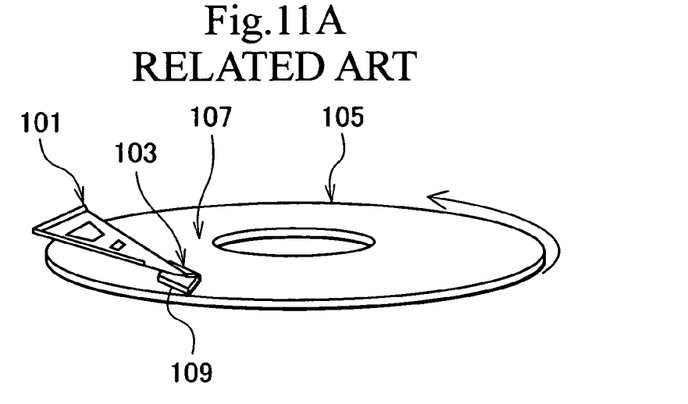
FIGS. 11A and 11B are perspective views showing hard disks employing the CSS method.
Figure 11B:
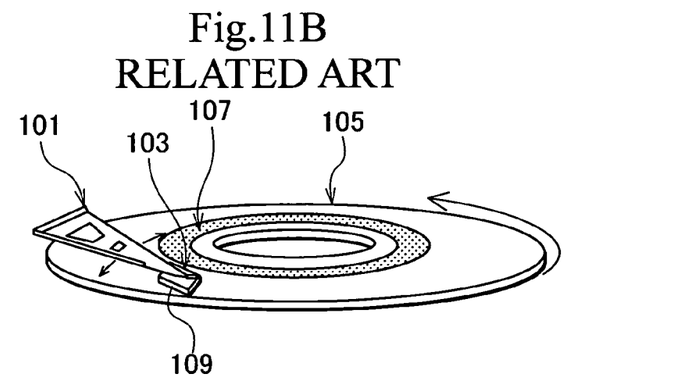
Figure 11C:
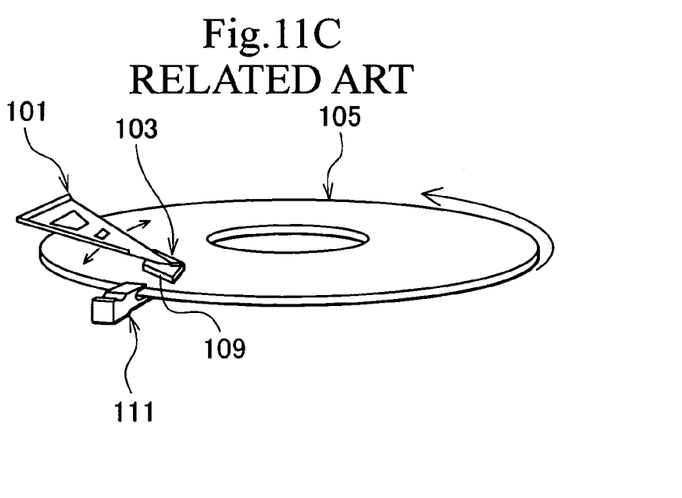
FIG. 11C is a perspective view showing a hard disk employing the LUL method.
Figure 11D:
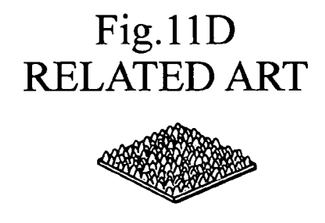
FIGS. 11D, 11E, and 11F are enlarged perspective views showing irregularities on the hard disks.
Figure 11E:
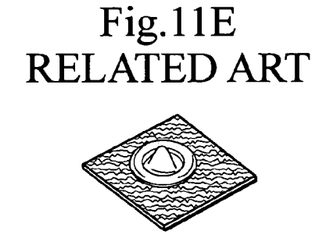
Figure 11F:
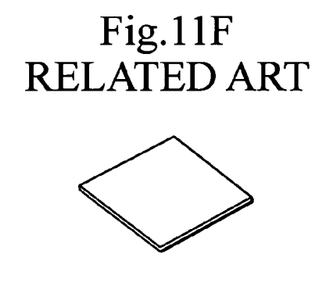

FIGS. 11A to 11F show the CSS and LUL methods, in which FIGS. 11A and 11B are perspective views showing the CSS method, FIG. 11C is a perspective view showing the LUL method, and FIGS. 11D, 11E, and 11F are enlarged perspective views partly showing disk surfaces.

In FIGS. 11A and 11B, the CSS method moves a head 103 supported with a head suspension 101 to a CSS area 107 formed along an inner circumference of a hard disk 105 when the hard disk 105 is stopped. To avoid a slider 109 attached to the head 103 from being attracted to the surface of the stopped hard disk 105, the CSS method treats the surface of the hard disk 105 as shown in FIGS. 11D and 11E. The surface treatment of FIG. 11D corresponds to the hard disk of FIG. 11A. This surface treatment slightly roughens the entire surface of the hard disk 105 including the CSS area 107 by machining or spattering to provide the surface with irregularities. The surface treatment of FIG. 11E corresponds to the hard disk of FIG. 11B. This surface treatment slightly roughens the CSS area 107 of the hard disk 105 by laser processing or machining to provide the CSS area 107 with irregularities.

The LUL method of FIG. 11C is called a ramp load method. A ramp block 111 made of synthetic resin is arranged at a side of a hard disk 105. When the hard disk 105 is stopped, a head suspension 101 is moved to a retract position. At this time, a tab (load bar, ramp contact, or corner) formed at a front end of a head 103 is slid and guided along a slope of the ramp block 111 so that a slider 109 may be separated away from the hard disk 105.

In this way, the LUL method separates the slider 109 away from the hard disk 105 when the hard disk 105 is stopped. As a result, no friction occurs between the slider 109 and the hard disk 105, and even if the hard disk 105 turns while the disk drive is being carried, the slider 109 is free from friction.

On the other hand, the CSS method has some problems.

Figure 12:
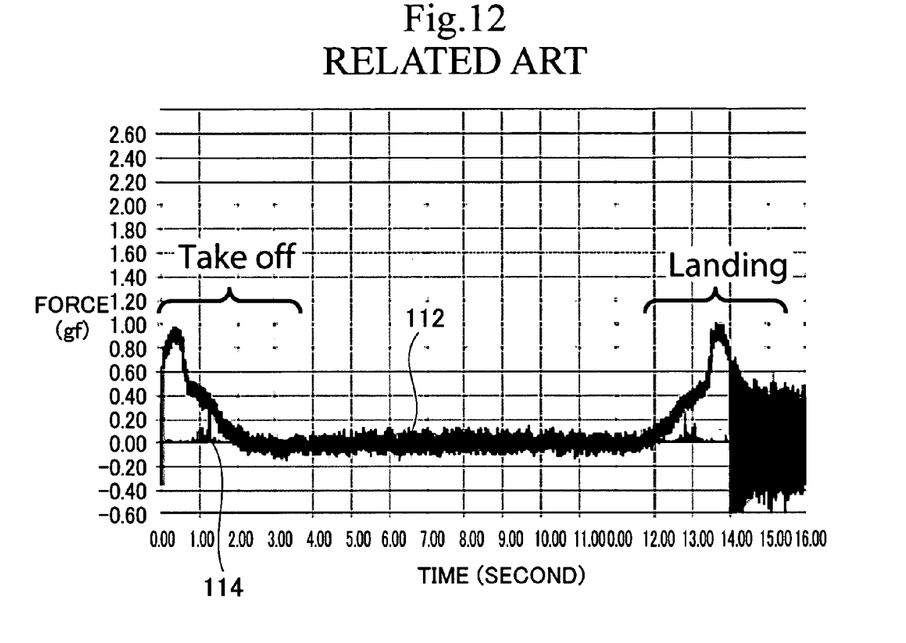
FIG. 12 is a graph showing frictional changes acting on a slider and the slider's force of hitting the hard disk of the CSS method, according to the related art.

FIG. 12 is a graph of acoustic emission representing frictional changes and vibration caused by friction between the slider 109 and the hard disk 105 according to the CSS method. In FIG. 12, an abscissa indicates time (second) and an ordinate indicates force (gf).

According to the CSS method, the slider 109 takes off when the hard disk 105 is turned and lands when the hard disk 105 is stopped. Friction between the hard disk 105 and the slider 109 applies frictional force to the slider 109 in a rotating direction of the hard disk 105; In FIG. 12, a main waveform 112 indicates frictional changes on the slider 109, and a minor waveform 114 indicates vibration cased by friction the slider 109 and the hard disk 105 due to rattling that occurs when the hard disk 105 is started and stopped. In FIG. 12, the frictional changes are represented with acoustic emission.

As is apparent in FIG. 12, large frictional force occurs when the slider 109 takes off and lands. It is also known from FIG. 12 that, during the taking off and landing, the slider 109 flutters and hits the hard disk 105.

To increase the storage capacity of the hard disk 105, the fly height of the slider 109 must be minimized. To achieve this, the hard disk 105 must not have the irregularities mentioned above. In some cases, the height of the slider is limited to restrict a lubricant thickness. These situations, which are frequently seen these days, increase frictional force between the slider 109 and the hard disk 105.

When the hard disk 105 is stopped, a motor to drive the hard disk 105 is put in a free state. The motor in the free state may reversely turn to rotate the hard disk 105 in a reverse direction when, for example, the disk drive is carried. If this happens, frictional force occurs between the hard disk 105 and the slider 109, to displace a tongue of the head toward a carriage that holds the head suspension in the disk drive.

Figure 13A:
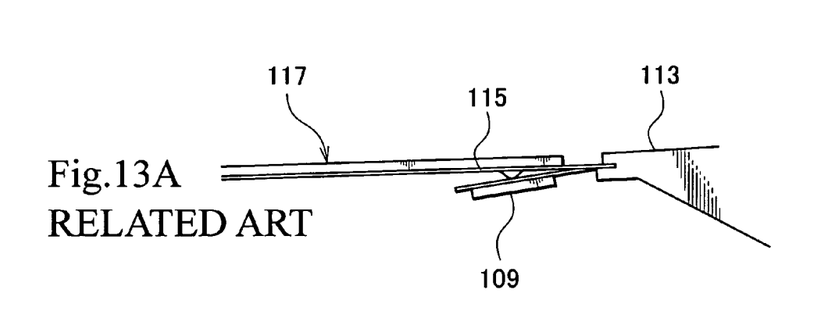
FIG. 13A shows a state before a tongue receives force in a carriage direction and FIG. 13B shows a state of displacement due to the carriage-direction force applied to the tongue.
Figure 13B:
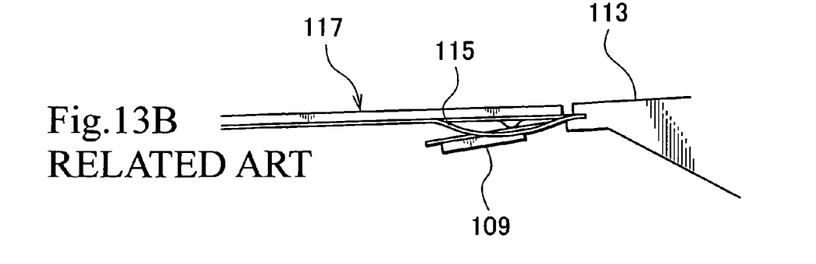

FIGS. 13A and 13B are models showing frictional force applied from a jig 113 to the slider 109 of the head suspension.

In FIG. 13A, the jig 113 gradually applies force to the head suspension. Then, outriggers 115 of the head suspension gradually deform to a state shown in FIG. 13B. The same will occur when the above-mentioned reverse rotation occurs to produce friction on the slider 109. Deformation of the outriggers 115 changes a set pitch angle of the slider 109 relative to the hard disk 105, to cause read/write errors. Another risk is to permanently deform a flexure 117 of the head suspension.

Figure 14:
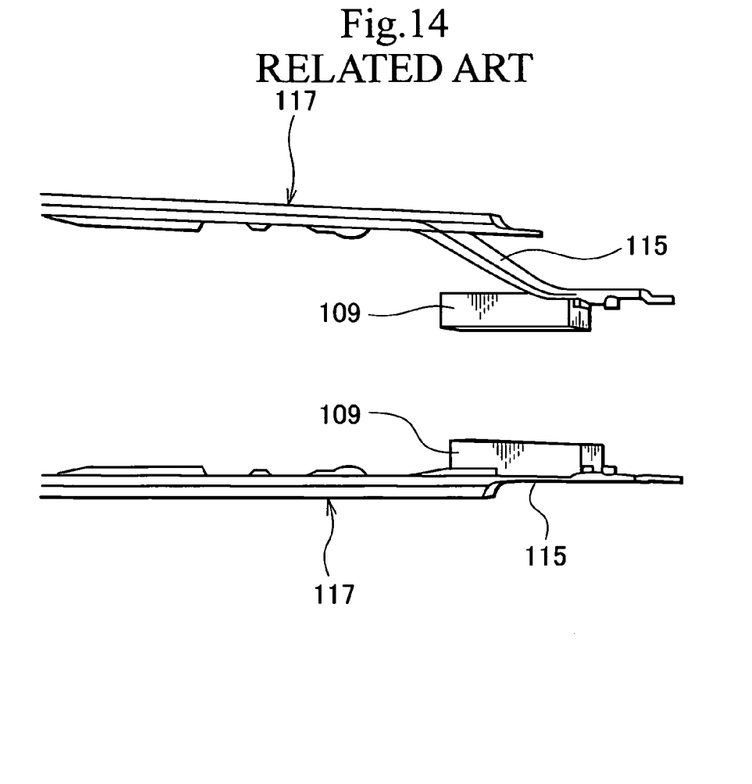
FIG. 14 is a view explaining permanent deformation of a flexure of the head suspension of the related art for the CSS method.

FIG. 14 explains a permanent deformation of the flexure 117.

If the deformation of the outriggers 115 advances to buckling, the flexure 117 will be permanently deformed to disable read/write operation.

Figure 15:
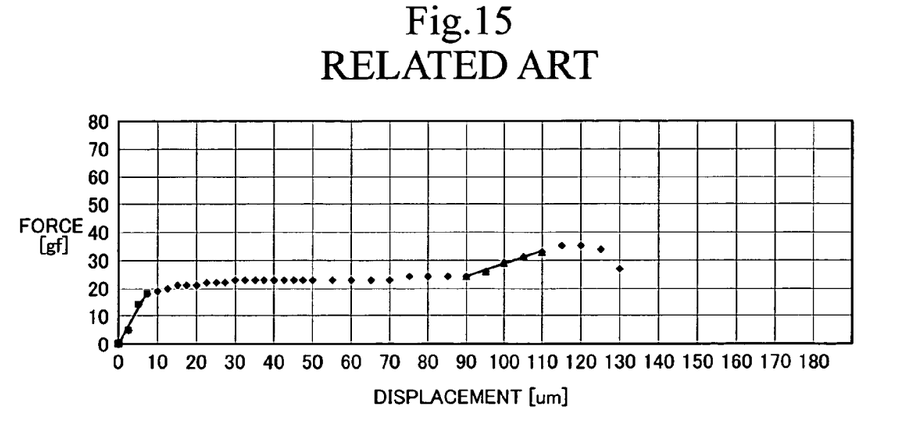
FIG. 15 is a graph showing deformation and buckling of the flexure of the related art for the CSS method.

FIG. 15 is a graph showing buckling according to frictional force applied to the slider 109 when the hard disk 105 reversely turns. In the graph, an abscissa indicates displacement (μm) and an ordinate indicates force (gf).

The graph of FIG. 15 shows that the flexure 117 starts to buckle when frictional force on the slider 109 exceeds 20 (gf). The frictional force further increases at a displacement of about 90 μm. This is because the outriggers 115 deeply deform to touch the surface of the hard disk 105.

The buckling of the flexure 117 excessively displaces the tongue of the head of the head suspension. To restrict displacement of the tongue, there is a head suspension having a limiter.

Figure 16:
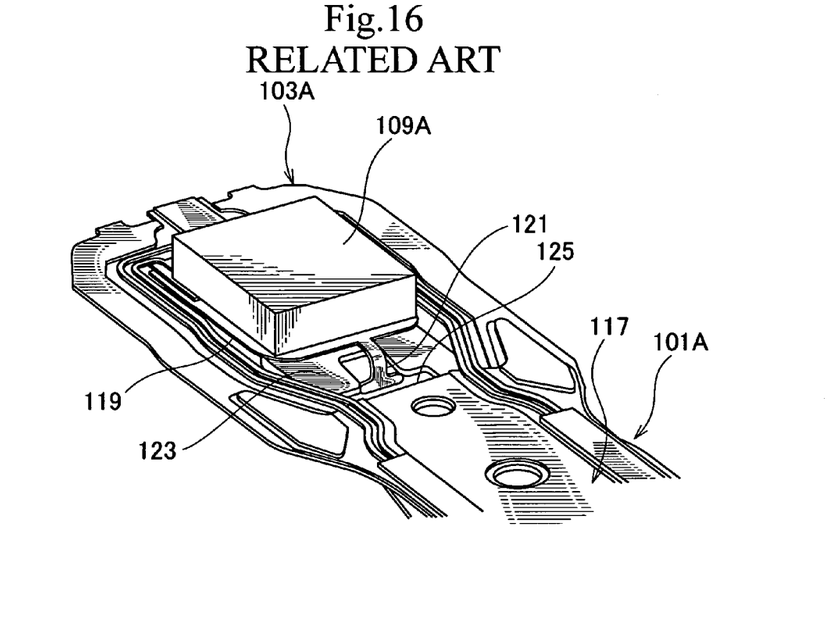
FIG. 16 is a perspective view partly showing a head suspension having a limiter according to a related art.

FIG. 16 is a perspective view partly showing a head suspension having such a limiter. In FIG. 16, the head suspension 101A has a head 103A having a tongue 119. The tongue 119 is provided with the T-shaped limiter 121. If the tongue 119 sways, the limiter 121 engages with a load beam 123, to thereby stabilize a slider 109A attached to the tongue 119. If the above-mentioned reverse rotation produces frictional force to displace the tongue 119, the limiter 121 will get in contact with a part 125 of a flexure 117A. The limiter 121, however, is originally to restrict vibration of the slider 109A, and therefore, is insufficient to restrict displacement of the tongue 119 caused by frictional force.

Figure 17:
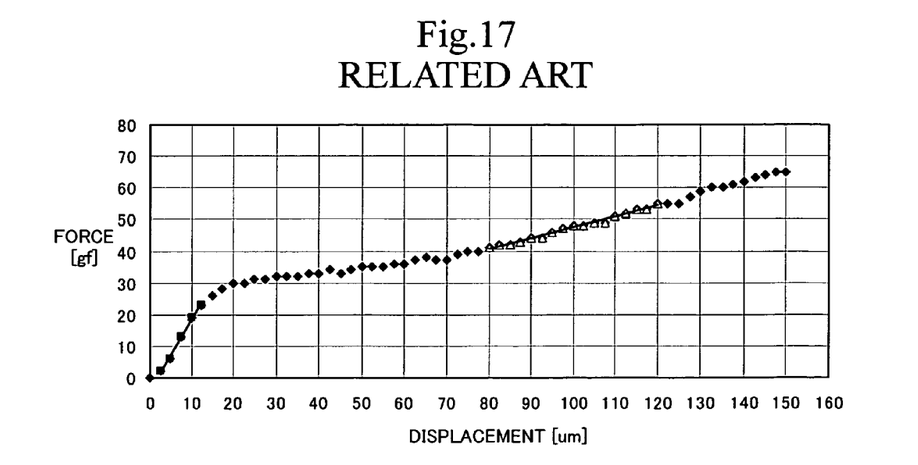
FIG. 17 is a graph showing deformation and buckling of a flexure of the related art of FIG. 16.

FIG. 17 is a graph showing deformation and buckling occurring on the flexure 117A of FIG. 16. Frictional force applied to the flexure 117A changes like that of FIG. 15, to deform and buckle the flexure 117A. In the middle of deformation of the flexure 117A, the T-shaped limiter 121 comes in contact with the part 125 of the flexure 117A. This corresponds to a linear part from a displacement of 80 µm in the graph of FIG. 17. The force applied to the flexure 117A, however, continuously increases. Namely, the limiter 121 provides no effect of suppressing the buckling of the flexure 117A.

To correctly write and read a hard disk with a slider in a disk drive employing the CSS method, what is important is to suppress deformation of a flexure when the hard disk is reversely turned (for example, refer to U.S. Pat. No. 5,771,136).

SUMMARY OF THE INVENTION

An object of the present invention is to provide a head suspension capable of restricting deformation of a flexure caused by frictional force produced when a hard disk turns in a reverse direction. Also provided is a method of processing such a head suspension.

In order to accomplish the objects, an aspect of the present invention provides a head suspension having a limiter formed on a flexure or a load beam, to restrict deformation of a tongue caused by frictional force produced between a hard disk and a slider when the hard disk reversely turns.

When the hard disk turns in a reverse direction, the limiter restricts deformation of the tongue within a given range, to thereby maintain a correct pitch angle for the slider and prevent the buckling of the flexure.

BRIEF DESCRIPTION OF THE DRAWINGS

FIGS. 7A to 7C are views showing a head suspension according to a third embodiment of the present invention, in which FIG. 7 is an enlarged perspective view showing a limiter of the head suspension, FIG. 7B is an enlarged side view showing the limiter.

FIGS. 11A to 11F are views showing hard disks according to related arts, in which

FIGS. 13A and 13B are views partly showing the head suspension of the related art for the CSS method, in which

DETAILED DESCRIPTION OF EMBODIMENTS

Head suspensions according to embodiments of the present invention will be explained with reference to the drawings. In each embodiment, the head suspension is used in a hard disk drive, to support a head that writes and reads data to and from a disk that is rotated by a motor in the hard disk drive. Each embodiment provides the head suspension with a limiter to restrict deformation of a flexure of the head suspension due to frictional force produced when the hard disk rotates in a reverse direction.

First Embodiment

[General Configuration of Head Suspension]

Figure 1:
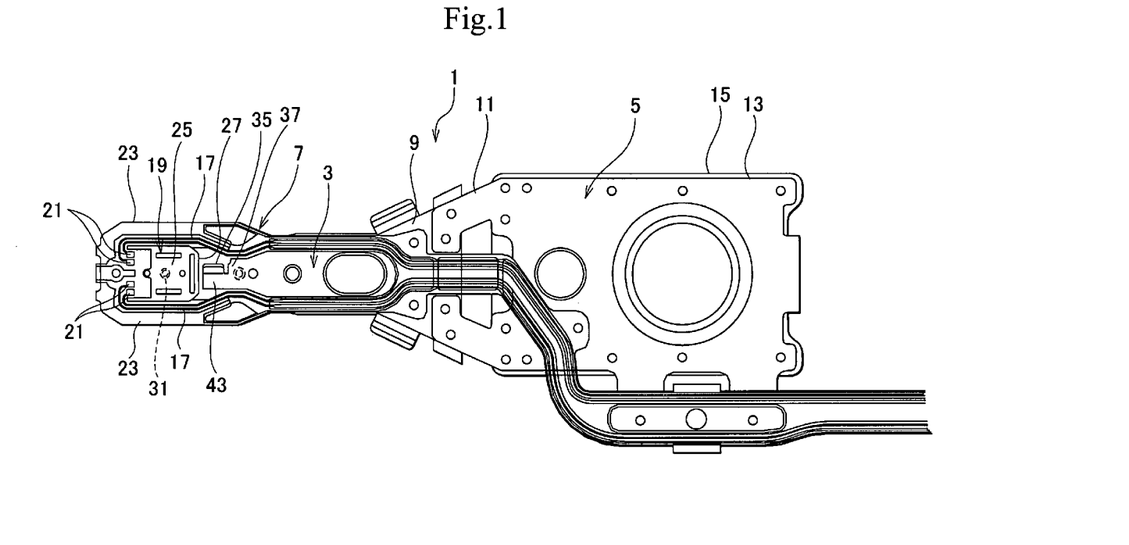
FIG. 1 is a plan view showing a head suspension according to a first embodiment of the present invention.
Figure 2:
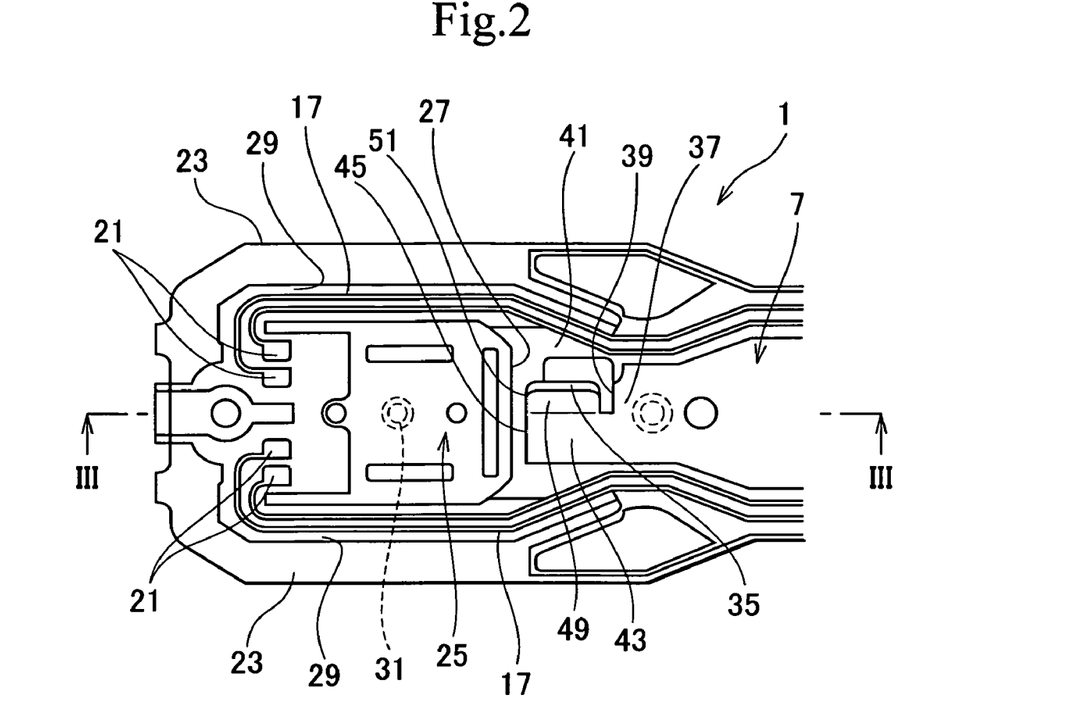
FIG. 2 is an enlarged plan view partly showing the head suspension of the first embodiment.
Figure 3:
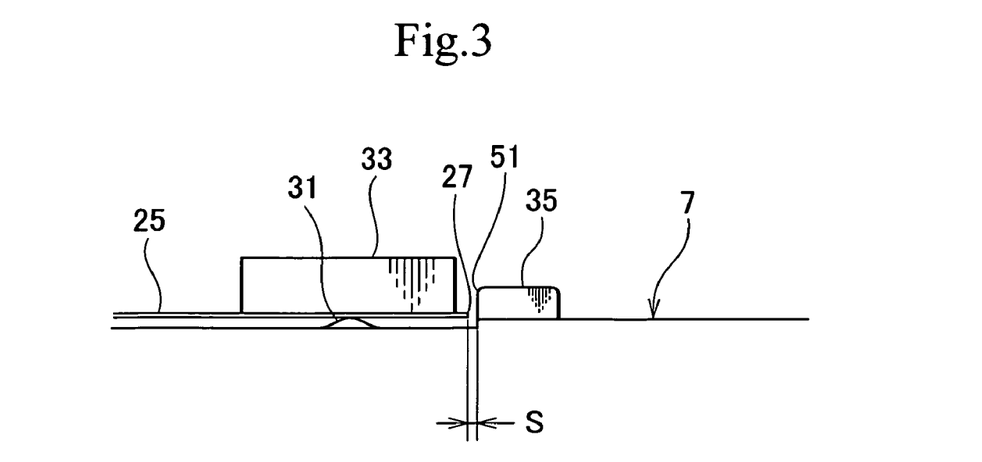
FIG. 3 is a sectional view taken along a line III-III of FIG. 2.
Figure 4:
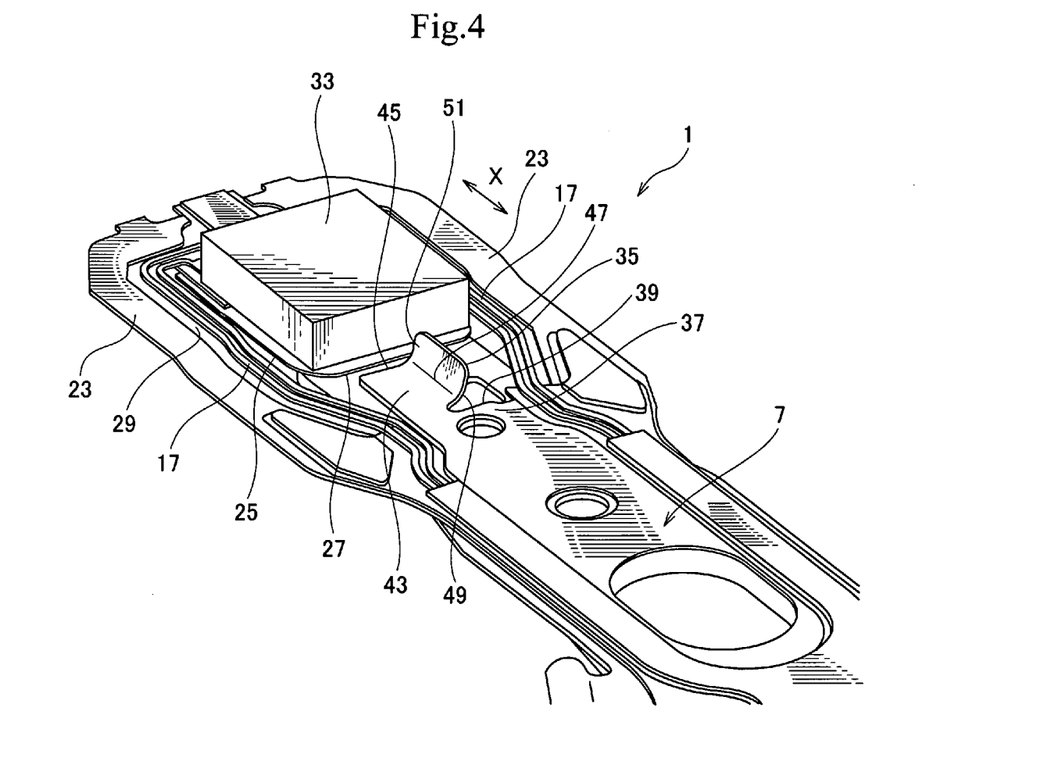
FIG. 4 is a perspective view partly showing the head suspension of the first embodiment.

FIG. 1 is a perspective view showing a head suspension 1 according to the first embodiment of the present invention, FIG. 2 is an enlarged plan view partly showing the head suspension 1, FIG. 3 is a sectional view taken along a line III-III of FIG. 2, and FIG. 4 is a perspective view partly showing the head suspension 1.

In FIG. 1, the head suspension 1 has a load beam 3, a base 5, and a flexure 7.

The load beam 3 applies load to a head 19 and has a rigid part 9 and a resilient part 11. The rigid part 9 is made of, for example, stainless steel and is relatively thick, for example, about 100 µm thick.

The resilient part 11 is independent of the rigid part 9 and is made of, for example, a thin resilient stainless-steel rolled plate. The resilient part 11 has a precise spring constant that is lower than that of the rigid part 9. The resilient part 11 has a thickness "t" of, for example, 40 µm. A first end of the resilient part 11 is fixed to a rear end of the rigid part 9 by, for example, laser welding. A second end of the resilient part 11 is integral with a reinforcing plate 13.

The base 5 has a base plate 15. The base plate 15 is laid over the reinforcing plate 13 and is fixed thereto by, for example, laser welding. The reinforcing plate 13 reinforces the base plate 15, to thereby form the base 5. The base 5 is attached to an arm of a carriage and is driven around an axis. The base 5 serves as a component of the arm that resiliently supports the load beam 3.

The flexure 7 has a metal base made of, for example, a thin resilient stainless-steel rolled plate, an insulating layer formed on a surface of the metal base, and conductive wiring 17 formed on the insulating layer. The flexure 7 is fixed to the rigid part 9 by, for example, laser welding. A first end of the wiring 17 is connected to write and read terminals 21 of the head 19 and a second end thereof is extended toward the base 5.

The flexure 7 has left and right outriggers 23 that extend along the head 19. Front ends of the outriggers 23 support a cantilever tongue 25. The tongue 25 has a free end 27 oriented toward the base 5. The tongue 25 is arranged between the left and right outriggers 23 with substantially uniform gaps 29 interposed between the tongue 25 and the outriggers 23. Between the tongue 25 and the outriggers 23, the wiring 17 runs over the left and right gaps 29.

The tongue 25 is in contact with a dimple 31 formed on the load beam 3. The height of the dimple 31 is about 70 μm. The tongue 25 and dimple 31 are in contact with each other to maintain the swaying freedom of the head 19. As shown in FIGS. 3 and 4, the tongue 25 has a write/read slider 33. The slider 33 has terminals electrically connected to the terminals 21.

[Limiter]

The flexure 7 has a limiter 35. The limiter 35 restricts displacement of the tongue 25 that may occur due to frictional force produced between the hard disk and the slider 33 when the hard disk turns in a reverse direction.

The limiter 35 extends in a longitudinal direction, in which the load beam 3 is extended, of the load beam 3 and is on the arm side, i.e., the base 5 side relative to the free end 27 of the tongue 25. The limiter 35 is integral with a part 37 of the flexure 7 and faces the tongue 25.

The limiter 35 is formed by bending the part 37 of the flexure 7. The part 37 of the flexure 7 has an edge 39 that is substantially parallel to the free end 27 of the tongue 25. Between the edge 39 and the free end 27 of the tongue 25, there is a space 41. In the space 41, the limiter 35 is formed by bending the part 37.

More precisely, a projection 43 is integrally extended from the edge 39 of the flexure 7 into the space 41. The projection 43 has a rectangular plan shape and has an edge 45 that is parallel to the free end 27 of the tongue 25. One side of the projection 43 is bent and raised to form the limiter 35.

The projection 43 is bent substantially at a right angle along a line 47 that is in the longitudinal direction X (FIG. 4) of the load beam 3, to form the limiter 35 integrally. Between the limiter 35 and the projection 43, there is a curve 49. The limiter 35 has a contacting part 51 that is equal to the edge 45 of the projection 43 and comes in contact with the free end 27 of the tongue 25. Between the contacting part 51 of the limiter 35 and the free end 27 of the tongue 25, there is a gap S as shown in FIG. 3. According to the embodiment, the gap S is about 50 μm, which corresponds to an etching limit when the flexure 7 is processed by etching. The limiter 35 is formed from the flexure 7, and therefore, the accuracy of the gap S may be equalized to that of the etching. The gap S may be narrowed by using another processing technique.

[Displacement Restriction]

When the hard disk is stopped, the motor for driving the hard disk is put in a free state. The free-state motor may reversely turn to reversely rotate the hard disk. The reverse rotation of the hard disk produces frictional force between the hard disk and the slider 33, to displace the tongue 25 of the head 19 toward the base 5, i.e., toward the carriage.

The force on the tongue 25 gradually deforms the outriggers 23, and the tongue 25 moves toward the limiter 35. When the movement of the tongue 25 in the longitudinal direction of the load beam 3 reaches the gap S (50 μm in the embodiment), the free end 27 of the tongue 25 comes in contact with the contacting part 51 of the limiter 35, to prevent further displacement of the tongue 25. At this time, stress acting on the limiter 35 is in a compressing direction, and therefore, the limiter 35 itself will not deform due to extending the limiter 35 in the longitudinal direction of the load beam 3.

Figure 5:
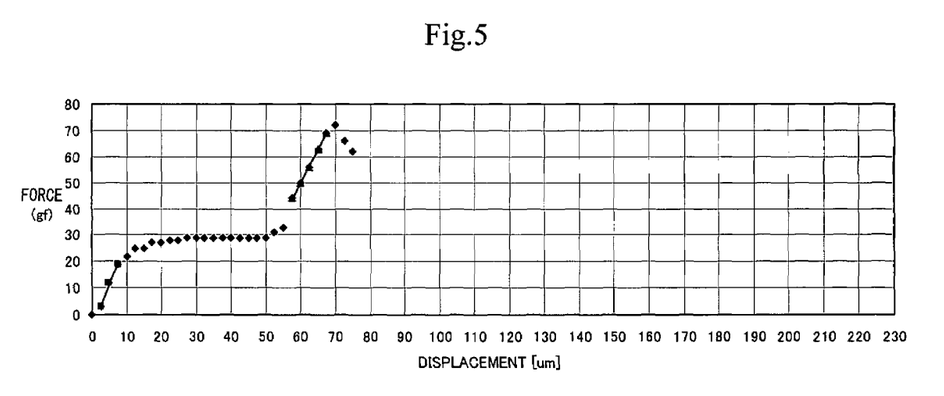
FIG. 5 is a graph showing a relationship between displacement of a tongue and reaction of a flexure according to the head suspension of the first embodiment.

FIG. 5 is a graph showing changes in the reaction of the flexure 7 due to frictional force acting on the slider 33 when the disk reversely turns. An abscissa represents a displacement (μm) of the tongue 25 and an ordinate represents force (gf).

In FIG. 5, the tongue 25 is displaced as the frictional force acting on the slider 33 increases, to thereby deform the flexure 7. When the displacement of the tongue 25 reaches about 50 μm, the reaction of the flexure 7 steeply increases. This means that the tongue 25 comes in contact with the limiter 35, which restricts the displacement of the tongue 25.

This results in limiting the deformation of the outriggers 23 within a given range. Resilient force of the outriggers 23 can prevent from changing a pitch angle of the slider 33, and thereby, secure a pitch angle of the slider 33. The limiter 35 prevents the outriggers 23 from excessively deforming, thereby preventing the buckling of the flexure 7. Therefore, the head suspension 1 can accurately read and write data from and to the hard disk by the slider 33.

According to the embodiment, the limiter 35 is formed on the base 5 side, i.e., on the arm side with respect to the free end 27 of the tongue 25 in the longitudinal direction of the load beam 3. This configuration secures the space 41 for forming the limiter 35 by bending the part 37 of the flexure 7. Namely, the limiter 35 needs no space in the gaps 29 between the outriggers 23 and the tongue 25.

If the gaps 29 must include a space for the limiter 35 in addition to spaces for the wiring 17 that is arranged before bending the limiter 35, the gaps 29 will be unnecessarily wide after bending the limiter 35, to excessively widen the head 19 including the outriggers 23. By separating the space 41 from the gaps 29, the first embodiment can properly narrow the gaps 29 to reduce the size of the head 19.

Second Embodiment

Figure 6:
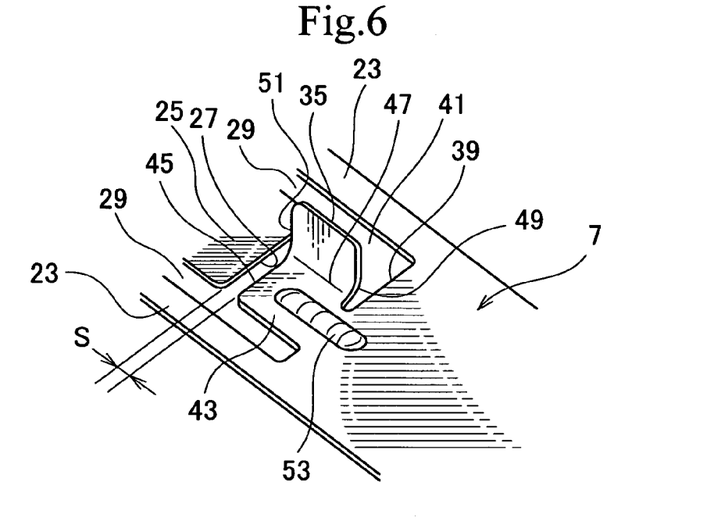
FIG. 6 is an enlarged perspective view partly showing a tongue and limiter of a head suspension according to a second embodiment of the present invention.

FIG. 6 is an enlarged perspective view partly showing a tongue and limiter of a head suspension according to the second embodiment of the present invention. The configuration of the second embodiment is basically the same as that of the first embodiment, and therefore, the same parts are represented with the same reference marks.

The second embodiment adds an embossment 53 to the configuration of the first embodiment. The embossment 53 protrudes in the same direction in which the limiter 35 protrudes. The embossment 53 extends from the edge 39 to the projection 43 of the flexure 7 in the longitudinal direction of the load beam 3.

The embossment 53 improves the rigidity of the projection 43 in the contacting direction of the tongue 25. This results in more steeply increasing the reaction of the limiter 35 and more surely suppressing deformation of the outriggers 23.

Third Embodiment

Figures 7A, 7B:
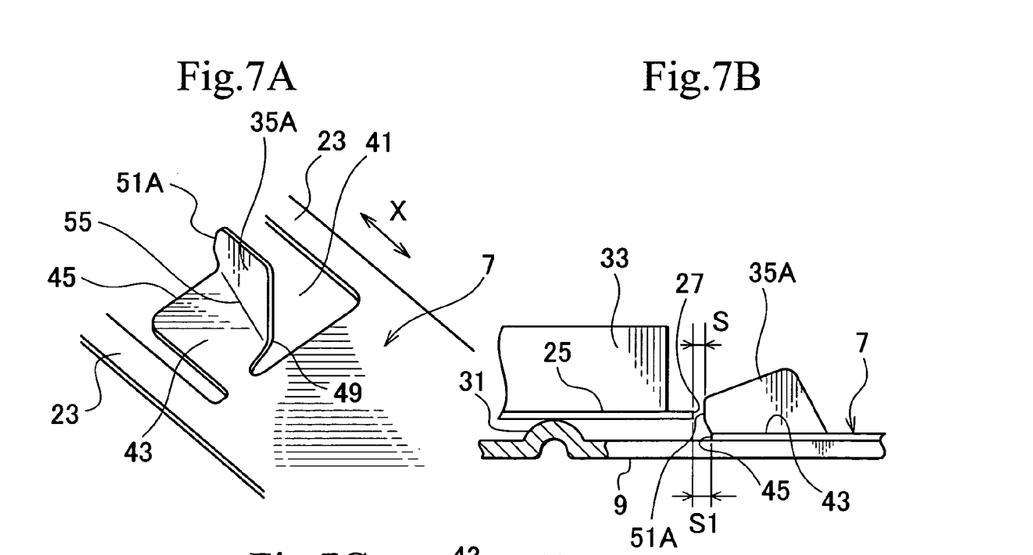
Figure 7C:
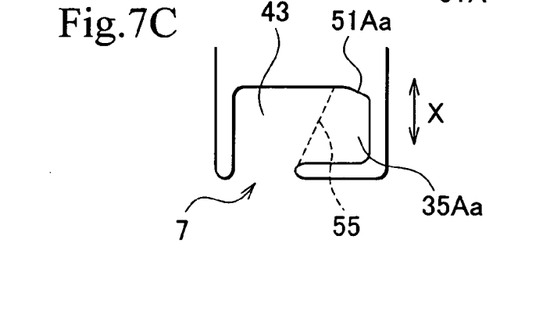
FIG. 7C is an enlarged plan view showing a bend line of the limiter.

FIGS. 7A to 7C are views showing a head suspension according to the third embodiment of the present invention, in which FIG. 7A is an enlarged perspective view showing a limiter of the head suspension, FIG. 7B is an enlarged side view showing the limiter, and FIG. 7C is an enlarged plan view showing a bend line of the limiter. The configuration of the third embodiment is basically the same as that of the first embodiment, and therefore, the same parts are represented with the same reference marks. Parts that are different from those of the first embodiment are represented with corresponding numerals plus "A."

The limiter 35A according to the third embodiment is bent obliquely with respect to the longitudinal direction of the load beam, to face the free end 27 of the tongue 25. Namely, the limiter 35A is bent along a bend line 55 that is oblique relative to the longitudinal direction (arrow X) of the load beam as shown in FIGS. 7A and 7C. In FIG. 7C, the projection 43 includes a limiter part 35Aa and a slant 51Aa serving as a contacting part.

In FIGS. 7A and 7B, the limiter 35A is bent along the line 55 so that the limiter part 35Aa may serve as the limiter 35A and the slant 51Aa as the contacting part 51A. In FIG. 7B, the contacting part 51A is closer to the free end 27 of the tongue 25 than the edge 45 of the projection 43, and the contacting part 51A faces the free end 27 in parallel therewith. It is possible to set a gap S1 between the edge 45 of the projection 43 and the free end 27 of the tongue 25 and a gap S between the contacting part 51A of the limiter 35A and the free end 27 of the tongue 25 as, for example, S1=50 μm and S=20 μm. Namely, the third embodiment can easily set the gap S shorter than the gap S1 which is equal to the gap S of other embodiments.

With these arrangements, the third embodiment can surely limit deformation of the flexure 7.

Fourth Embodiment

Figure 8:
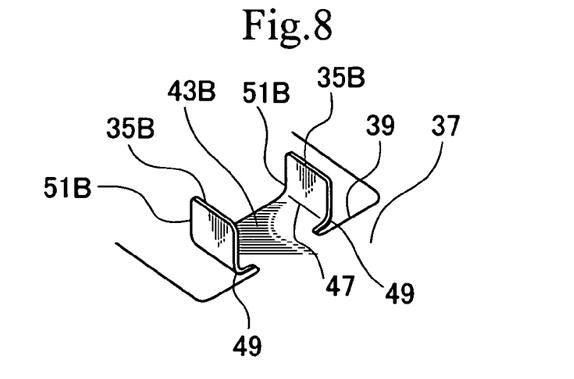
FIG. 8 is an enlarged perspective view showing a limiter of a head suspension according to a fourth embodiment of the present invention.

FIG. 8 is an enlarged perspective view showing a limiter of a head suspension according to the fourth embodiment of the present invention. The configuration of the fourth embodiment is basically the same as that of the first embodiment, and therefore, the same parts are represented with the same reference marks. Parts that are different from those of the first embodiment are represented with corresponding numerals plus "B."

The fourth embodiment is characterized by two limiters 35B that are bent from left and right sides of a projection 43B.

Namely, the fourth embodiment has two contacting parts 51B that come in contact with the tongue 25. When received with the contacting parts 51B of the left and right limiters 35B, the tongue 25 is restricted in deformation in left and right directions in addition to a longitudinal direction.

Fifth Embodiment

Figure 9:
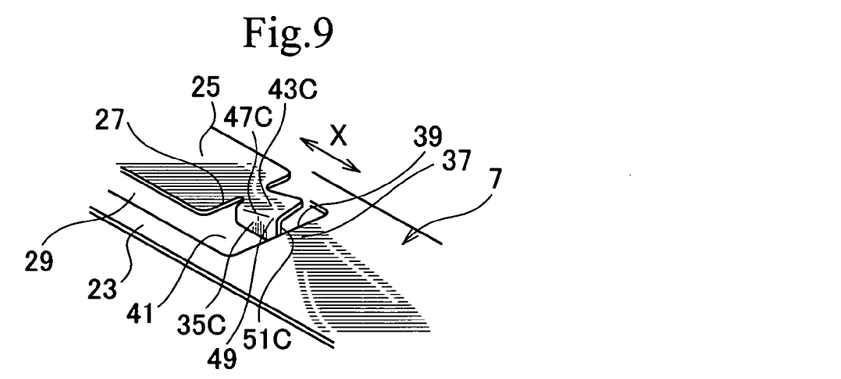
FIG. 9 is an enlarged perspective view showing a limiter of a head suspension according to a fifth embodiment of the present invention.

FIG. 9 is an enlarged perspective view showing a limiter of a head suspension according to the fifth embodiment of the present invention. The configuration of the fifth embodiment is basically the same as that of the first embodiment, and therefore, the same parts are represented with the same reference marks. Parts that are different from those of the first embodiment are represented with corresponding numerals plus "C."

The fifth embodiment is characterized by a limiter 35C formed from a projection 43C that is integrally extended from the free end 27 of the tongue 25. Namely, the limiter 35C is bent from the projection 43C along a bend line 47C, to face the part 37 of the flexure 7. The bend line 47C is in the longitudinal direction (arrow X) of the load beam 3. A contacting part 51C of the limiter 35C comes in contact with the edge 39 of the part 37 of the flexure 7.

When the tongue 25 is displaced, the contacting part 51C of the limiter 35C comes in contact with the edge 39 of the flexure 7, to restrict deformation of the flexure 7.

The fifth embodiment may have the embossment of the second embodiment. The limiter of the fifth embodiment may be obliquely bent relative to the longitudinal direction of the load beam 3 like the third embodiment, or may be divided into left and right pieces like the fourth embodiment.

Sixth Embodiment

Figure 10:
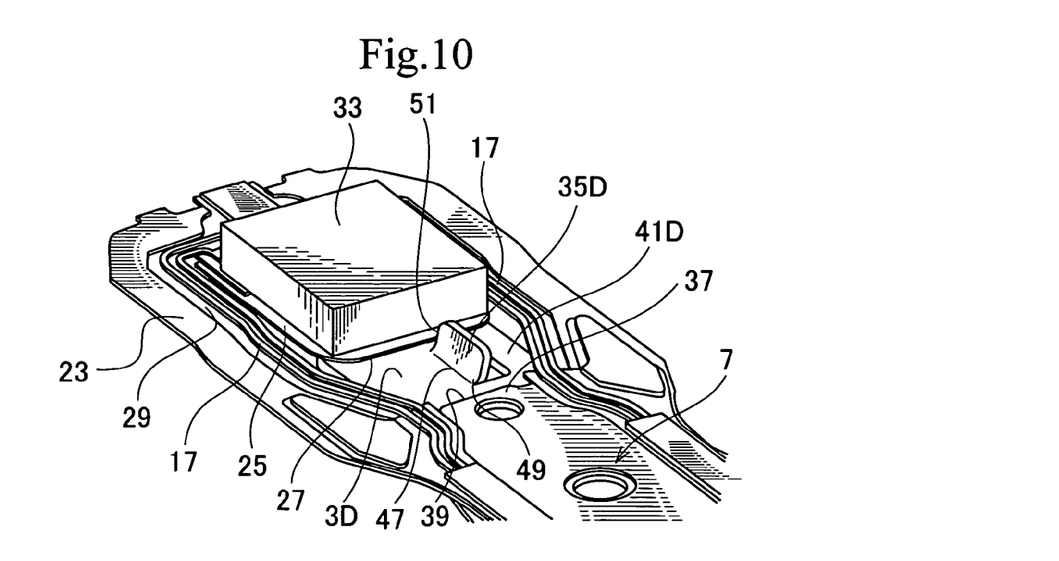
FIG. 10 is an enlarged perspective view partly showing a head suspension according to a sixth aspect of the present invention.

FIG. 10 is an enlarged perspective view partly showing a head suspension according to the sixth aspect of the present invention. The configuration of the sixth embodiment is basically the same as that of the first embodiment, and therefore, the same parts are represented with the same reference marks. Parts that are different from those of the first embodiment are represented with corresponding numerals plus "D."

The head suspension 1 of the sixth embodiment is characterized by a limiter 35D integrally formed from a part of a load beam 3D, to face the tongue 25. On the flexure 7, the sixth embodiment has no projection 43 nor limiter 35 of the first embodiment. Instead, the sixth embodiment cuts and bends the limiter 35D from an area 41D of the load beam 3D.

The limiter 35D of the sixth embodiment stops the tongue 25, to thereby limit deformation of the flexure 7.

The sixth embodiment may have the embossment of the second embodiment. The limiter of the sixth embodiment may be obliquely bent relative to the longitudinal direction of the load beam 3 like the third embodiment, or may be divided into left and right pieces like the fourth embodiment.

In each of the above-mentioned embodiments, the limiter is integral with the flexure or the load beam. Instead, the limiter may be separately prepared and attached to the flexure or the load beam with, for example, adhesive.

What is claimed is:

1. A head suspension comprising:
   a load beam resiliently supported with an arm and configured to apply load onto a head, the arm being turned around an axis, the head having a slider to write and read data to and from a hard disk;
   a flexure attached to the load beam, said flexure having a flexure main body portion supported fixed relative to said load beam and a tongue that supports the slider, the flexure main body portion having a distal end with respect to said axis, said flexure having a cutout area which forms an outer perimeter of the tongue and an edge of said flexure main body portion such that the tongue has a first end supported at the distal end of the flexure main body portion and a second end on said outer perimeter of the tongue disposed away from the distal end of the flexure main body portion and extended toward the arm, said second end being a free end having a free end edge on said outer perimeter;
   a limiter integrally formed from a part of the flexure which opposes the free end of the tongue in a longitudinal direction of the load beam; and
   the cutout area defining an unobstructed gap between the limiter and the free end edge permitting displacement of the free end edge in the longitudinal direction up to engagement with the limiter at which position the displacement is restricted by said engagement direction.

2. A method of processing the head suspension of claim 1, comprising bending a part of the flexure to form the limiter.

3. The method of claim 2, wherein the bending is carried out along a bend line oriented in a direction oblique to the longitudinal direction of the load beam so as to face the limiter to the free end edge of the tongue.

4. A bead suspension comprising:

a load beam resiliently supported with an arm and configured to apply load onto a head, the arm being turned around an axis, the head having a slider to write and read data to and from a hard disk;

a flexure attached to the load beam and having a tongue that supports the slider;

the tongue having a first end and a second end, the first end being fixed on the flexure and the second end being a free end;

the flexure having a flexure main body portion which is attached to the load beam, said main body portion has a main body distal end which is distal with respect to said axis;

said flexure having first and second outrigger arms extending from the flexure main body distal end and spaced apart from each other with a flexure main body distal end edge extending transversely between the first and second outrigger arms, said first and second outrigger arms having ends connected by a flexure transverse portion;

the tongue having said first end supported at the flexure transverse portion and the second end on an opposite side of the tongue, away from the flexure transverse portion and disposed toward the arm; and a limiter, integrally formed from the free end of the tongue configured to restrict displacement of the tongue caused by a frictional force produced between the hard disk and the slider when the hard disk is reversely turned, the limiter being a folded portion of the flexure with a first limiter end distal the free end of the tongue and a second limiter end proximate said free end of the tongue; and wherein the limiter opposes a said flexure main body distal end edge of the flexure to define a gap which is unobstructed in a longitudinal direction of the load beam between the first limiter end and the flexure main body distal end edge of the flexure, the gap being not more than 50 μm between the first limiter end and the flexure main body distal end edge of the flexure opposed, and the limiter restricting the displacement of the tongue toward the arm in the longitudinal direction of the load beam by engaging said opposed part of the flexure, and said second limiter end being longitudinally spaced from said free end of the tongue a distance less than said 50 μm of said gap.

5. A head suspension comprising:

a load beam resiliently supported with an arm and configured to apply load onto a head, the arm being turned around an axis, the head having a slider to write and read data to and from a hard disk;

a flexure attached to the load beam and having a tongue that supports the slider, the flexure having a distal end with respect to said axis and the tongue having a first end supported at the distal end of the flexure and a second end on an opposite side of the tongue, away from the distal end of the flexure toward the arm, said second end being a free end;

the flexure having a flexure main body portion which is attached to the load beam, said main body portion has a main body distal end which is distal with respect to said axis;

said flexure having first and second outrigger arms extending from the flexure main body distal end and spaced apart from each other with a flexure main body distal end edge extending transversely between the first and second outrigger arms, said first and second outrigger arms having ends connected by a flexure transverse portion;

the tongue having said first end supported at the flexure transverse portion and the second end on an opposite side of the tongue, away from the flexure transverse portion and disposed toward the arm; and a limiter integrally formed from a part of the load beam and positioned in a space between the free end of the tongue and the flexure main body distal end edge which opposes the free end of the tongue in a longitudinal direction of the load beam so as to define an unobstructed gap between the limiter and the free end permitting displacement of the free end in the longitudinal direction up to engagement with the limiter at which position the displacement is restricted by said engagement, and said gap being not more than 50 μm so as to prevent permanent deformation of said first and second outrigger arms by displacement of the tongue in the longitudinal direction.

6. A method of processing the head suspension of claim 5, comprising:

bending a part of the load beam into the limiter.

7. The method of claim 6, wherein the bending is cried out along a bend line oriented in a direction oblique to the longitudinal direction of the load beam.

8. A head suspension comprising:

a load beam resiliently supported with an arm and configured to apply load onto a head, the arm being turned around an axis, the head having a slider to write and read data to and from a hard disk;

a flexure attached to the load beam and having a tongue that supports the slider, the flexure having a distal end with respect to said axis and the tongue having a first end supported at the distal end of the flexure and a second end on an opposite side of the tongue, away from the distal end of the flexure toward the arm, said second end being a free end; and a limiter integrally formed from a part of the flexure which opposes the free end of the tongue in a longitudinal direction of the load beam so as to define an unobstructed gap between the limiter and the free end permitting displacement of the free end in the longitudinal direction up to engagement with the limiter at which position the displacement is restricted by said engagement direction, wherein:

the flexure has a flexure main body portion which is attached to the load beam, said main body portion has a main body distal end which is distal with respect to said axis;

said flexure has first and second outrigger arms extending from the flexure main body distal end and spaced apart from each other with a flexure main body distal end edge extending transversely between the first and second outrigger arms, said first and second outrigger arms having ends connected by a flexure transverse portion;

the tongue having said first end supported at the flexure transverse portion and the second end on an opposite side of the tongue, away from the flexure transverse portion and disposed toward the arm; and the limiter extending from said flexure main body distal end edge so as to oppose the free end of the tongue to define the unobstructed gap between the limiter and the free end to be no more than 50 μm permitting displacement of the free end in the longitudinal direction up to engagement with the limiter at which position the displacement is restricted by said engagement direction such that permanent deformation of said first and second outrigger arms by displacement of the tongue in the longitudinal direction is prevented.

* * * * *